(12) United States Patent
Li et al.

(10) Patent No.: US 12,555,315 B2
(45) Date of Patent: Feb. 17, 2026

(54) HEURISTIC-BASED VARIABLE RATE SHADING FOR MOBILE GAMES

(71) Applicant: QUALCOMM Incorporated, San Diego, CA (US)

(72) Inventors: Caiqin Li, Shanghai (CN); Yanshan Wen, Shanghai (CN); Yunzhen Li, Shenzhen (CN); Yutong Liu, Shenzhen (CN); Xiandang Li, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/271,836

(22) PCT Filed: Mar. 30, 2021

(86) PCT No.: PCT/CN2021/083848
§ 371 (c)(1),
(2) Date: Jul. 11, 2023

(87) PCT Pub. No.: WO2022/204920
PCT Pub. Date: Oct. 6, 2022

(65) Prior Publication Data
US 2024/0320905 A1    Sep. 26, 2024

(51) Int. Cl.
*G06F 1/324* (2019.01)
*G06F 1/3228* (2019.01)
(Continued)

(52) U.S. Cl.
CPC .................... *G06T 15/80* (2013.01)

(58) Field of Classification Search
CPC ....... G06T 15/80; G06T 15/005; G06F 1/324; G06F 1/325; G06F 1/3296; G06F 1/3228
See application file for complete search history.

(56) References Cited

U.S. PATENT DOCUMENTS 9,836,869 B2 * 12/2017 Tsai .................... G06T 11/40
10,410,313 B2    9/2019 Saleh et al.
(Continued)

FOREIGN PATENT DOCUMENTS

KR      20200145669 A    12/2020
WO       2018026414 A1    2/2018

OTHER PUBLICATIONS

Supplementary European Search Report—EP21933605—Search Authority—Munich—Nov. 19, 2024—12 pages.
(Continued)

*Primary Examiner* — Xiao M Wu
*Assistant Examiner* — George Renze
(74) *Attorney, Agent, or Firm* — Procopio, Cory, Hargreaves & Savitch (57) ABSTRACT

This disclosure provides systems, devices, apparatus, and methods, including computer programs encoded on storage media, for heuristic-based variable rate shading for mobile games. A CPU that includes a GPU driver may obtain draw call information for a first frame of a plurality of frames. The first frame may be shaded based on a default shading rate (e.g., full shading rate). The draw call information may be associated with per shader frame states of the first frame. The CPU may estimate/detect one or more heavy draws for one or more subsequent frames of the plurality of frames based on the per shader states. The CPU may indicate, on a per draw basis, a reduced shading rate (e.g., half-shading rate) to a GPU that generates the one or more subsequent frames of the plurality of frames, when the plurality of frames is estimated to include the one or more heavy draws.

24 Claims, 6 Drawing Sheets

(51) Int. Cl.
  *G06F 1/3296*     (2019.01)
  *G06T 15/80*      (2011.01)

(56)             References Cited

U.S. PATENT DOCUMENTS

| | | | |
|---|---|---|---|
| 10,535,186 B2 | | 1/2020 | Clarberg |
| 2015/0178983 A1 | | 6/2015 | Akenine-Moller et al. |
| 2018/0284872 A1 | * | 10/2018 | Schluessler ........... G06F 1/3265 |
| 2019/0035049 A1 | | 1/2019 | Backer et al. |
| 2019/0172257 A1 | * | 6/2019 | Nevraev ................ G06T 15/005 |
| 2020/0143550 A1 | * | 5/2020 | Golas ........................ G06T 7/32 |
| 2021/0001220 A1 | * | 1/2021 | Cerny ........................ G06T 1/20 |

OTHER PUBLICATIONS

International Search Report and Written Opinion—PCT/CN2021/083848—ISA/CN—Dec. 30, 2021.

\* cited by examiner

| Game | Frame Status | Power Device-Panel | FPS HW Based FPS | FPS | FPS Power/FP | CPU Silver Core-Avg | CPU Silver Core-Avg Load | CPU Gold Core-Avg | CPU Gold Core-Avg Load | CPU Prime Core-Avg | CPU Prime Core-Avg Load | GPU Peak | GPU Avg | GPU Busy-Avg Load | GPU Busy-Top Load | Duration Duration(s) |
|---|---|---|---|---|---|---|---|---|---|---|---|---|---|---|---|---|
| Game1_60Super | full shading rate | 686 | 61.57 | 61.55 | 11.15 | 1101 | 19.48% | 1391 | 42.71% | 845 | 0.01% | 315 | 315 | 46.53% | 60% | 2290 |
| Game1_60Super | reduced shading rate | 676 | 61.60 | 61.48 | 11.00 | 1098 | 19.62% | 1368 | 42.21% | 845 | 0.01% | 315 | 315 | 38.49% | 52% | 2290 |
| Game2_Drving | full shading rate | 886 | 60.30 | 59.21 | 14.97 | 1109 | 30.74% | 1477 | 43.93% | 902 | 2.19% | 315 | 315 | 61.83% | 79% | 1125 |
| Game2_Drving | reduced shading rate | 841 | 60.31 | 59.26 | 14.19 | 1106 | 32.18% | 1406 | 44.06% | 900 | 2.15% | 315 | 315 | 52.06% | 67% | 1126 |
| Game2_Swimming | full shading rate | 806 | 60.27 | 59.42 | 13.56 | 1099 | 17.26% | 1103 | 49.25% | 856 | 1.01% | 519 | 381 | 68.51% | 86% | 1194 |
| Game2_Swimming | reduced shading rate | 777 | 60.29 | 59.42 | 13.07 | 1098 | 21.37% | 1118 | 46.20% | 872 | 0.97% | 474 | 370 | 65.23% | 86% | 1194 |
| Game3_Swimming | full shading rate | 661 | 60.30 | 39.91 | 16.55 | 1100 | 26.16% | 887 | 37.34% | 866 | 0.73% | 315 | 315 | 39.61% | 46% | 720 |
| Game3_Swimming | reduced shading rate | 634 | 60.32 | 39.92 | 15.87 | 1100 | 26.95% | 893 | 37.83% | 853 | 0.49% | 315 | 315 | 34.72% | 40% | 720 |
| Game4_60VeryHigh_RunningSnow | full shading rate | 815 | 59.86 | 59.46 | 13.71 | 1096 | 25.25% | 1509 | 47.00% | 858 | 0.93% | 315 | 315 | 49.26% | 60% | 1040 |
| Game4_60VeryHigh_RunningSnow | reduced shading rate | 781 | 61.72 | 59.69 | 13.09 | 1097 | 23.07% | 1499 | 46.72% | 904 | 0.90% | 315 | 315 | 41.85% | 52% | 1039 |
| Game4_60VeryHigh_Swimming | full shading rate | 793 | 59.86 | 59.61 | 13.30 | 1100 | 24.50% | 1278 | 45.05% | 888 | 0.82% | 315 | 315 | 56.00% | 61% | 322 |
| Game4_60VeryHigh_Swimming | reduced shading rate | 761 | 60.72 | 59.38 | 12.81 | 1096 | 23.51% | 1265 | 43.68% | 851 | 0.97% | 315 | 315 | 47.52% | 55% | 322 |
| Game5_45Max_Character | full shading rate | 665 | 59.00 | 44.49 | 14.94 | 1098 | 18.53% | 780 | 33.60% | 844 | 0.01% | 608 | 338 | 58.79% | 84% | 900 |
| Game5_45Max_Character | reduced shading rate | 635 | 59.00 | 44.39 | 14.30 | 1097 | 18.88% | 800 | 34.58% | 844 | 0.00% | 541 | 330 | 56.78% | 80% | 898 |

FIG. 4

| 60Hz | | Power | FPS | CPU (0~3) | CPU | CPU | CPU (4-6) | CPU | CPU | CPU (7~7) | CPU | CPU | GPU | GPU | GPU | GPU |
|---|---|---|---|---|---|---|---|---|---|---|---|---|---|---|---|---|
| | Frame Status | Device (mA) | FPS | Silver Core- Peak | Silver Core- Average | Silver Core- Average Load | Gold Core- Peak | Gold Core- Average | Gold Core- Average Load | Prime Core- Peak | Prime Core- Average | Prime Core- Average Load | GPU Peak | GPU Average | GPU Busy- Average Load | GPU Busy- Top Load |
| Game6 | full shading rate | 1785 | 60.71 | 1804 | 1099 | 19.15% | 2491 | 1203 | 55.52% | 2841 | 968 | 6.41% | 840 | 687 | 80.77% | 90% |
| | reduced shading rate | 1166 | 60.78 | 1804 | 1101 | 18.88% | 2491 | 1247 | 55.99% | 2841 | 956 | 5.35% | 771 | 528 | 80.28% | 88% |
| Game7 | full shading rate | 1791 | 60.59 | 1804 | 1229 | 28.55% | 2491 | 1239 | 53.08% | 2841 | 982 | 6.71% | 840 | 656 | 81.11% | 99% |
| | reduced shading rate | 1362 | 60.76 | 1804 | 1235 | 26.74% | 2491 | 1250 | 54.27% | 2841 | 870 | 1.09% | 840 | 581 | 79.07% | 99% |

HEURISTIC-BASED VARIABLE RATE SHADING FOR MOBILE GAMES

CROSS REFERENCE TO RELATED APPLICATION(S)

This application is a National Stage Application filed under 35 U.S.C. § 371 of PCT International Application No. PCT/CN2021/083848, entitled "HEURISTIC-BASED VARIABLE RATE SHADING FOR MOBILE GAMES" and filed Mar. 30, 2021, which is expressly incorporated by reference herein in its entirety.

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Shading rate extensions for a computing device may allow applications to indicate different fragment shading rates at a draw call level to conserve power and processing resources of the computing device. Such extensions may rely on an application being configured to indicate an item to be processed at a reduced shading rate. Thus, if the application is not configured to explicitly call shading rate extensions to process specified items, a performance gain and power reduction may not be realized by the computing device. Accordingly, there is a need for improved fragment shading techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may obtain draw call information for a first frame of a plurality of frames, the first frame being shaded based on a full shading rate, the draw call information associated with per shader frame states of the first frame; estimate, based on the per shader frame states of the first frame, whether at least one subsequent frame of the plurality of frames includes one or more heavy draws; and indicate a reduced shading rate, when the at least one subsequent frame of the plurality of frames is estimated to include the one or more heavy draws, the reduced shading rate being less than the full shading rate.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 illustrates a table indicative of test data determined based on applying a half-shading rate to multiple draws in accordance with one or more techniques of this disclosure.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Adjusting a shading rate of a fragment shader for video games and applications may increase performance of a computing device and conserve power. While reducing the shading rate may impact a visual quality of a frame in some cases, such reductions may be implemented to decrease power consumption by the computing device via a reduced amount of shading performed by the fragment shader. Such reductions in shading may be advantageous for draws/portions of the frame that are expected to be covered by subsequent draws, as such portions do not end up being visible to the end user when the frame is displayed. However, even for portions of the frame that do end up being visible to the end user, reductions in the shading rate may be performed at a pixel level and may not be easily recognized by an eye of a user and/or may correspond to a region of the frame that may not be a focal point of the user. Accordingly, reductions in the shading rate associated with some draws may not be visible to an end user, as such draws or portions thereof may be subsequently covered by subsequent draws before the frame is displayed, or the reduction may be performed at a pixel level via techniques that are not easily recognizable to an eye of an end user. However, in both cases, the decrease in power consumption may be more advantageous to a performance of the computing device than a resulting decrease in the visual quality of the frame.

Shading rate extensions may allow applications to indicate different fragment shading rates at a draw call level. An extension may be additional instructions for an application that increase a capability of the application and/or increase an availability of data to the application. While the shading rate extensions may be used to conserve power and processing resources, execution of such extensions may rely on the application being configured to indicate a draw to be shaded at a reduced shading rate. Accordingly, computing device efficiencies may be improved based on determining when and to what degree (e.g., half shading rate, quarter shading rate, etc.) to reduce shading rates.

For example, a computing device may determine to reduce shading rates when a heavy draw is detected. A heavy draw may be a draw that causes the GPU to consume an increased amount of power and shading time for rendering a frame. For example, a heavy draw may correspond to 10-20% of a total GPU frame time. A heavy draw may be further associated with an increased amount of texture sampling, such that when the GPU renders the heavy draw, an increased amount of both pixel shading and/or texture sampling may occur. Heavy draws may be dependent on factors including a number of fragments shaded and a complexity of the fragment shaders used. Instances of heavy draws (e.g., on computing devices) may include draws corresponding to grass, terrain, foliage, buildings, characters, etc. By improving fragment shading techniques, a number of heavy draw instances may be decreased, as features that previously corresponded to heavy draws may be associated with non-heavy draws via reduced shading.

In order to reduce the shading rate, a computing device (e.g., CPU that includes a GPU driver) may determine draw call information based on a sample frame of a plurality of frames to be rendered/displayed, which may thereby be used to determine heavy draws included in one or more subsequent frames of a plurality of frames. One or more preconditions and/or rules may be applied based on the draw call information of the sample frame to determine whether to reduce the shading rate for at least one draw of the one or more subsequent frames. In an example, the one or more preconditions and/or rules may include 2 preconditions and 6 rules. Example preconditions and rules are explained in further detail herein. If the one or more preconditions and/or rules are not satisfied, the shading rate may remain unchanged. If the one or more preconditions and/or rules are satisfied, the computing device may determine a reduced shading rate (e.g., half-shading rate or quarter shading rate) for the one or more subsequent frames. The reduced shading rate may be based on a draw-specific rule mask that balances performance of the computing device with visual quality to an end user.

Figure 1:
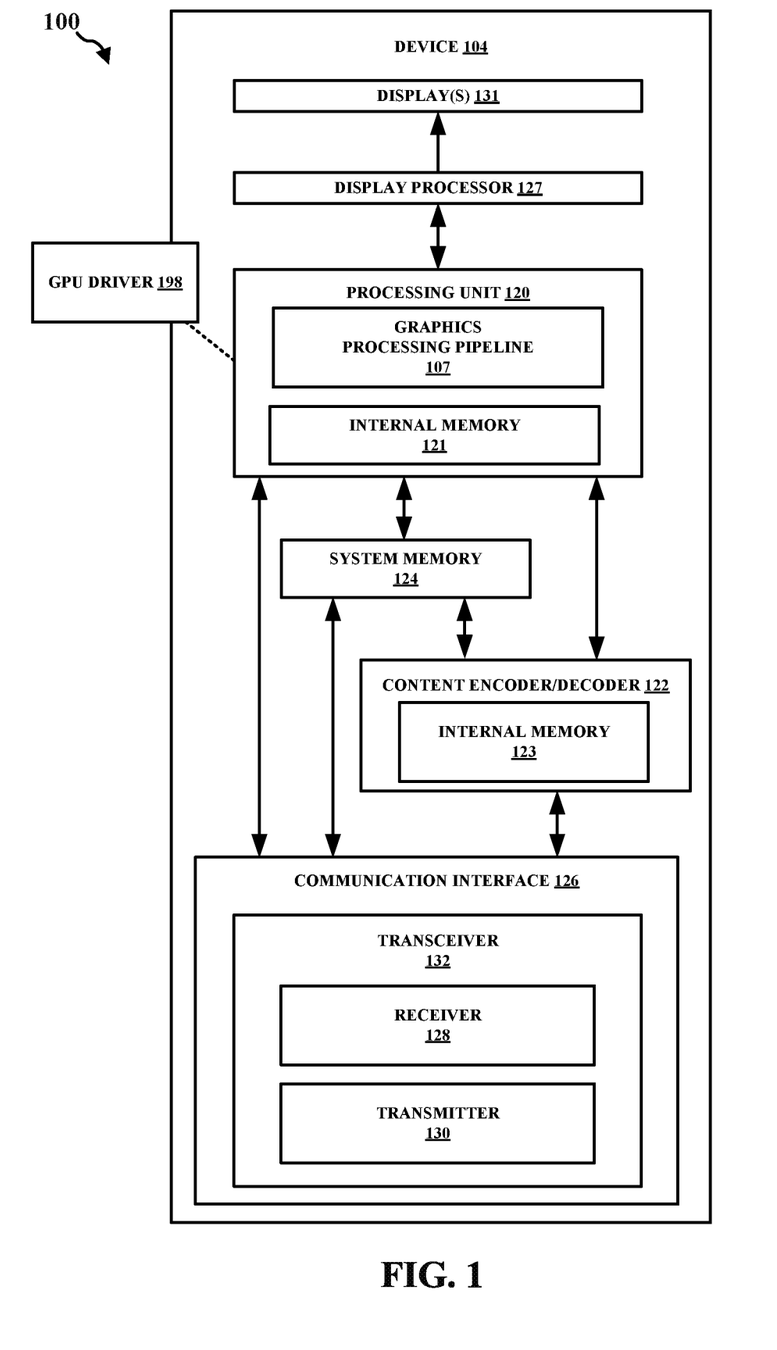
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may process instructions to reduce a shading rate for at least one draw. For example, the processing unit 120 can run a GPU driver or other software 198 configured to obtain draw call information for a first frame of a plurality of frames, the first frame being shaded based on a full shading rate, the draw call information associated with per shader frame states of the first frame; estimate, based on the per shader frame states of the first frame, whether at least one subsequent frame of the plurality of frames includes one or more heavy draws; and indicate a reduced shading rate, when the at least one subsequent frame of the plurality of frames is estimated to include the one or more heavy draws, the reduced shading rate being less than the full shading rate. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
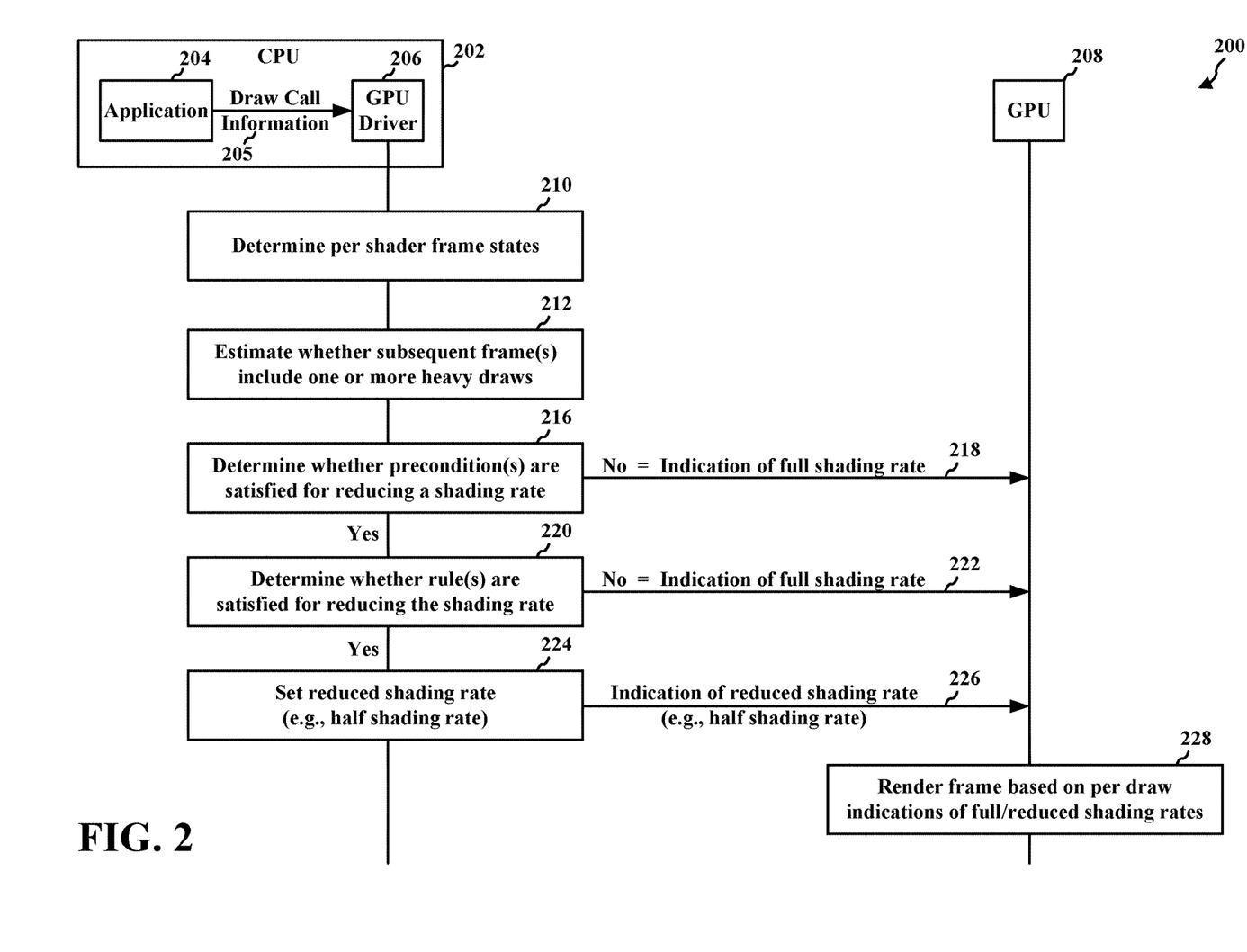
FIG. 2 is a call flow diagram illustrating example communications between a CPU and a GPU in accordance with one or more techniques of this disclosure.

FIG. 2 is a call flow diagram 200 illustrating example communications between a CPU 202 and a GPU 208 in accordance with one or more techniques of this disclosure. The CPU 202 may execute an application 204 that causes draw call information for one or more frames to be received, at 205, via a GPU driver 206 included in the CPU 202. In examples, the application 204 may be a gaming application that causes the GPU 208 to utilize an increased amount of time, power, texture sampling, etc., to render the one or more frames based on the draw call information. Such increases may correspond to certain types of draws, e.g., draws of grass, terrain, foliage, water, buildings, etc.

The draw call information received, at 205, via the GPU driver 206 may be associated with a first shading rate, such as a default/full shading rate. In examples, the first shading rate may consume at least a predetermined amount of a total GPU frame time (e.g., 10%, 20%, etc.). At 210, the CPU 202 may determine per shader frame states (e.g., vertex counts, texture samples, etc.) for a first/sample frame indicated by the application 204, based on the draw call information received, at 205.

The CPU 202 may estimate, at 212, whether subsequent frame(s) include one or more heavy draws. The estimation of whether the one or more subsequent frames include the one or more heavy draws may be further based on determinations, at 216 and 220, of whether precondition(s) and rule(s) are satisfied for reducing a shading rate. If the subsequent frames are estimated to not include the one or more heavy draws, the CPU 202 may maintain the shading rate at the full shading rate by indicating the full shading rate to the GPU 208.

If the subsequent frames are estimated to include the one or more heavy draws, the CPU 202 may determine whether the precondition(s) are satisfied for reducing the shading rate for a draw of the one or more subsequent frames. The precondition(s) may be used to identify draws that can have a reduced shading rate without significantly impacting a user experience, as described in further detail below. The precondition(s) may be based on a determination that draws are not depth-only draws, that the draws are not user interface (UI) surface draws, etc. If the precondition(s) are not satisfied, the CPU 202 may maintain the shading rate at the full shading rate by indicating, at 218, the full shading rate to the GPU 208.

If the precondition(s) are satisfied, the CPU 202 may determine, at 220, whether the rule(s) are satisfied for reducing the shading rate for a draw of the one or more subsequent frames. The rule(s) may be associated with vertex counts, texture sampling, alpha tests, preZ-ed/z-prepass procedures, etc. Such rules are described in further detail below. If the rule(s) are not satisfied, the CPU 202 may maintain the shading rate at the full shading rate by indicating, at 222, the full shading rate to the GPU 208. While the diagram 200 illustrates that determining whether the precondition(s) are satisfied occurs before determining whether the rule(s) are satisfied, in other examples determining whether the rule(s) are satisfied may occur before determining whether the precondition(s) are satisfied. In still further examples, the determinations of whether the precondition(s) and the rule(s) are satisfied may occur in parallel.

Some example implementations may utilize different numbers of preconditions and/or rules. Thus, the determinations, at 216 and 220, of whether the precondition(s) and rule(s) are satisfied may include determining whether one precondition/rule is satisfied, multiple preconditions/rules are satisfied, all preconditions/rules are satisfied, etc. If both the precondition(s) and the rule(s) are satisfied, the CPU 202 may set, at 224, the reduced shading rate for the draw of the one or more subsequent frames. The reduced shading rate may be set a half shading rate. In further examples, the reduced shading rate may be set a quarter shading rate. An indication of the reduced shading rate (e.g., half shading rate) may be transmitted, at 226, from the CPU 202 to the GPU 208. The GPU 208 may render, at 228, a frame (e.g., the one or more subsequent frames) based on per draw indications of full/reduced shading rates received, e.g., at 218, 222, or 226, by the GPU 208.

Figure 3:
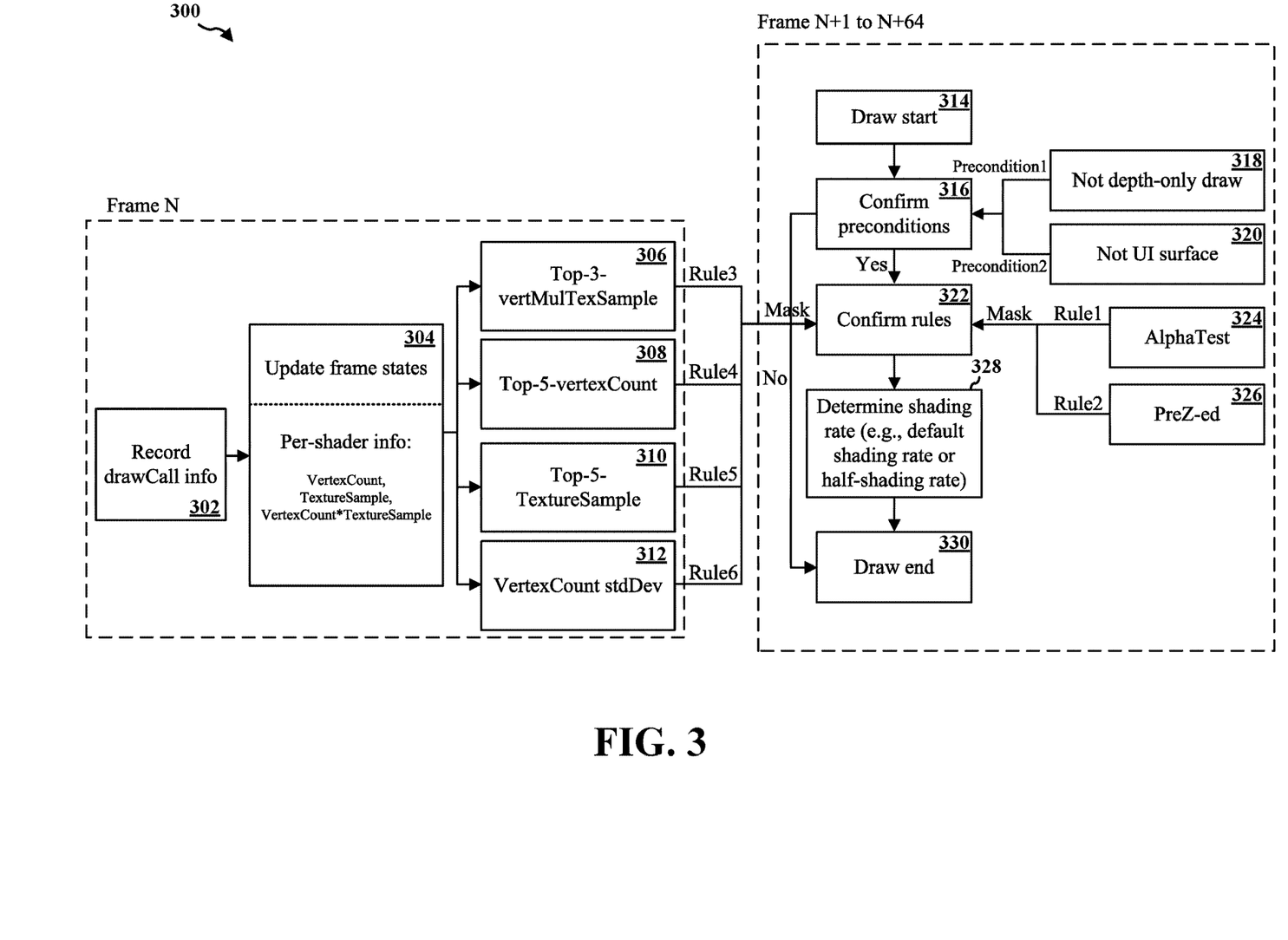
FIG. 3 illustrates a diagram for applying a reduced shading rate to one or more draws of a frame in accordance with one or more techniques of this disclosure.

FIG. 3 illustrates a diagram 300 for applying a reduced shading rate to one or more draws of a frame in accordance with one or more techniques of this disclosure. Adjusting a load of a fragment shader for video games, such as mobile games, and other applications may increase a performance and conserve power of a computing device, such as a mobile device. For example, shading rate extensions may allow applications to indicate different fragment shading rates at a draw call level. While the shading rate extensions may be used to conserve power and processing resources, execution of such extensions may rely on the application being configured to indicate a draw to be shaded at the reduced shading rate. If the application is not configured to call shading rate extensions in source code, a performance gain and power reduction may not be realized by the mobile/computing device. Accordingly, mobile/computing device efficiencies may be improved based on the computing device detecting heavy draws and determining a reduced shading rate for the heavy draws via a graphics driver.

A heavy draw may be a draw that causes the GPU to consume an increased amount of power and/or shading time for rendering a frame. For example, a heavy draw may correspond to 10-20% of a total GPU frame time. A heavy draw may be further associated with an increased amount of texture sampling, such that when the GPU renders the heavy draw, an increased amount of both pixel shading and/or texture sampling may occur. Heavy draws may be dependent on two factors including a number of fragments shaded and a complexity of the fragment shaders. By improving fragment shading techniques, a number of heavy draw instances may be reduced. Instances of heavy draws (e.g., on mobile devices) may include certain types of draws, e.g., draws of grass, terrain, foliage, buildings, characters, etc.

In order to reduce the shading rate, a CPU that includes a GPU driver may determine draw call information based on a sample frame (e.g., frame N) and update per-shader states (e.g., at 304) at an end of the sample frame. For example, the GPU driver may perform a Record drawCall information procedure, at 302, to determine the draw call information and update the shader status/frame states, at 304, on a per-shader basis. Per-shader information may include a VertexCount, a TextureSample, a VertexCount*TextureSample, etc. The draw call information determined based on the sample frame may be used to predict heavy draws for subsequent frames, such as frames N+1 to N+64 (e.g., when the sampling frequency is equal to 64).

One or more preconditions and/or rules may be defined (e.g., for the CPU that includes the GPU driver) to detect the heavy draws. For example, the one or more preconditions and/or rules may include two (2) preconditions and six (6) rules. A first precondition may be to determine (e.g., at 318) that a draw is not a depth-only draw. A depth-only draw may be used for a shadow map and/or a z-prepass, which may be an operation that bypasses a fragment shader to process a fragment-bounded frame in reduced time. Applying a reduced shading rate for depth-only draws may affect an accuracy of subsequent draws. Therefore, reduced shading rates for depth-only draws may be avoided. A second precondition may be to determine (e.g., at 320) that the draw is not a UI surface draw, as applying a reduced shading rate for UI draws may cause perceivable visual aliasing to an end user. Accordingly, the reduced shading rate may be masked based on the first precondition and/or the second precondition.

After a draw start is initiated, at 314, for each of the subsequent frames (e.g., frame N+1 through frame N+64), the CPU may analyze the draw based on confirming, at 316, the one or more preconditions, such as the first precondition, at 318, and the second precondition, at 320. If the one or more preconditions are not satisfied, a draw end may be executed, at 330, for the draws that do not satisfy the one or more preconditions. If the one or more preconditions are satisfied, the CPU may analyze the draw based on confirming the rules, at 322, which may be associated with one or more rendering patterns.

A first rule performed, at 324, may be an AlphaTest, where the fragment shader may be configured to execute a kill instruction for the draw. AlphaTests may be used for draws such as foliage draws. A second rule performed, at 326, may be a preZ-ed/z-prepass rule for draws that use a graphics library equal (GLEqual) operation as a depth function. For example, foliage color drawing may be performed based on the z-prepass. A third rule performed, at 306, may be to select the top 3 vertexes multiplied by a number of texture sample of the fragment shader (e.g., a Top-3-vertMulTex-Sample-fragmentShaders operation). The top 3 fragment shaders determined based on the highest vertexCount*textureSample, where the textureSample ≥4, may be used for draws such as terrain, buildings, vehicles, characters, equipment, etc. A fourth rule performed, at 308, may be to select the top 5 shaders based on the highest vertexCount (e.g., a Top-5-vertexCount-fragmentShaders operation), which may be used for draws such as terrain, buildings, vehicles, equipment, etc. A fifth rule performed, at 310, may be to select the top 5 fragment shaders based on the highest number of texture samples (e.g., a Top-5-textureSample-fragmentShaders operation), which may be used for draws such as terrain, stone, etc. A sixth rule performed, at 312, may be based on an EnvironmentMesh and may be configured to mask blending draws and draws having a vertex count less than 3 times the standard deviation of the total vertex count (e.g., a VertexCount stdDev operation). That is, for the EnvironmentMesh (verticesCount<3*stdDev) && (blend==false). The EnvironmentMesh may be used for non-character draws, such as in multiplayer online battle arena (MOBA) games.

One or more of the six rules may be analyzed/applied to the subsequent frames (e.g., frame N+1 through frame N+64) to determine instances of heavy draws. Application of the third rule, the fourth rule, the fifth rule, and/or the sixth rule to the subsequent frames may be based on the Record drawCall information determined, at 302, for the sample frame (e.g., frame N), whereas application of the first rule and/or the second rule to the subsequent frames may be independent of the Record drawCall information determined, at 302, for the sample frame. Any combination of the one or more rules (e.g., the first rule through the sixth rule) may be applied to the subsequent frames to mask a part or all of one or more of the subsequent frames. If the draws of the subsequent frames satisfy the preconditions but do not satisfy the one or more rules applied to the subsequent frames, the draw end may be executed, at 330, for the draws. If the draws of the subsequent frames satisfy the preconditions confirmed, at 316, and the one or more rules are confirmed, at 322, the computing device may implement a reduced shading rate for the draw.

The shading rate may be set/determined, at 328. For example, a half-shading rate or a quarter-shading rate may be applied to draws that satisfy the preconditions and the rules. In further aspects, the shading rate may be set/determined, at 328, to remain as a default shading rate (e.g., full shading rate) for draws that do not satisfy the preconditions and the rules. Given that render flows of some mobile/computing games and applications may be more efficient than render flows of other mobile/computing games and applications, the computing device may be configured to apply a preconfigured game-specific/application-specific rule mask that balances performance and visual quality. A first example may be that the first rule and the second rule are applied to determine heavy draws for a first frame/first mobile game, a second example may be that the second rule, the third rule and the fifth rule are applied to determine heavy draws for a second frame/second mobile game, a third example may be that the sixth rule is applied to determine heavy draws for a third frame/third mobile game, etc. Based on application of the preconditions and the rules, the computing device may set a reduced shading rate (e.g., at 328) for heavy draws, such as draws associated with foliage, terrain, buildings, characters, etc.

To increase a detection rate of heavy draws, the one or more rules may be combined to determine a best/improved ruleMask that balances the performance and the visual quality. For example, a first ruleMask (e.g., 0xF) for a first render flow may apply the first rule, the second rule, the third rule, and the fourth rule, whereas a second ruleMask (e.g., 0x20) for a second render flow may apply the sixth rule. Other ruleMasks may be determined for other render flows based on different combinations of the one or more rules. In some cases, further rules may be added to a set of the one or more rules that, for example, may include the first rule through the sixth rule. In further cases, one or more of the first rule through the sixth rule may be absent from the set of rules. The CPU may determine the set of rules on an application-specific basis (e.g., upon launching an application) such that real-time balancing of the performance and the visual quality may occur.

In an example where a heavy draw is associated with rendering a water surface (e.g., for a character that is swimming), the first rule through the fourth rule may be applied in association with the shading rate being set to the half-shading rate, which may reduce a processing time of the GPU by a certain percentage, e.g., 19.24%, without a substantially perceivable visual quality difference to the end user. For instance, if portions of heavy draws are expected to be covered by subsequent draws, a reduction in the shading rate of such portions of the heavy draws may be moot, as such portions may not end up being visible to the end user. However, for the portions of the heavy draws that do end up being visible to the end user, the half-shading rate may be used to provide a reduce processing time and power savings. The half-shading rate may be performed at the pixel level, such that a difference in the shading rate may not be easily recognized by the user's eyes. Further, visible pixels that are shaded at the reduced shading rate may not correspond to a region of focus of the user's eyes. In a different example where a heavy draw is associated with a snowy terrain, the first rule through the fourth rule may be applied in association with the shading rate being set to the half-shading rate, which may reduce a processing time of the GPU by a certain percentage, e.g., 13.09%, without a substantially perceivable visual quality difference to the end user.

Figure 5:
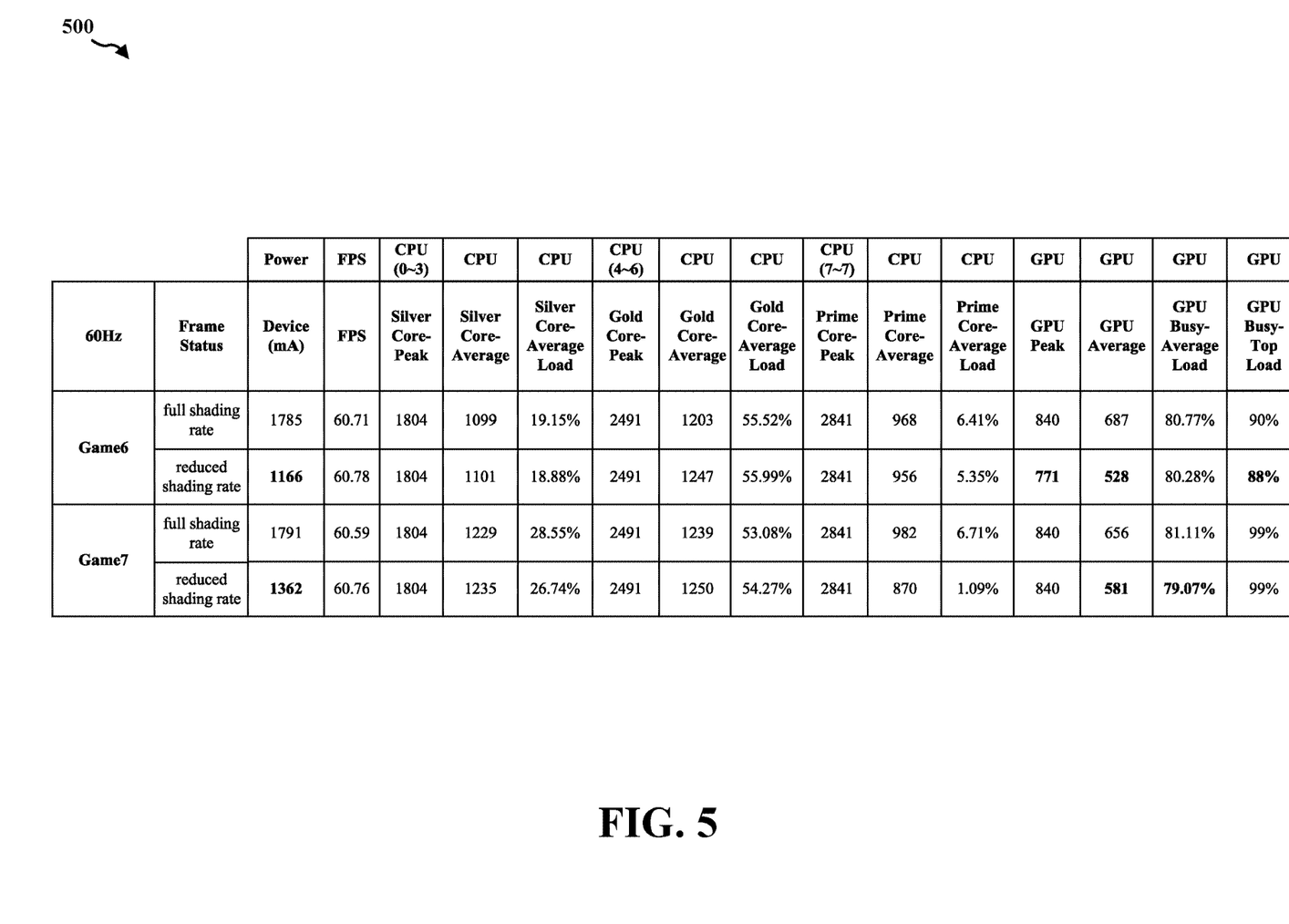
FIG. 5 illustrates a table indicative of test data determined based on applying a half-shading rate to multiple draws in accordance with one or more techniques of this disclosure.

FIGS. 4-5 illustrate tables 400-500 indicative of test data determined based on applying a half-shading rate to multiple draws in accordance with one or more techniques of this disclosure. More specifically, the table 400 includes a number of games associated with instances of heavy draws, where the test data is compared for each game based on the full shading rate and the half-shading rate. In both cases of the shading rate, the GPU is able to maintain a target frames-per-second (FPS) processing rate, but at a decreased power level when applying the reduced shading rate. For example, a power level of Game1 may be decreased by 10 mA, a power level of Game2_Driving may be decreased by 45 mA, a power level of Game2_Swimming may be decreased by 29 mA, a power level of Game3_Swimming may be decreased by 27 mA, a power level of Game4_VeryHigh_RunningSnow may be decreased by 34 mA, a power level of Game4_VeryHigh_Swimming may be decreased by 32 mA, and a power level of Game5 may be decreased by 30 mA.

In some instance of the reduced shading rate, the GPU peak frequency may be decreased. For example, the GPU peak frequency may be decreased from 519 MHz to 474 MHz for Game2_Swimming, or from 608 MHz to 541 MHz for Game5. Further, a decreased GPU Busy-Average Load is indicated in the table 400 in association with the different gaming environments for applications of the different shading rates. Other parameters associated with the CPU, the GPU, FPS, power, duration, etc., are also indicated in the table 400. The render flows of the games/applications indicated in the table 400 may be based on render flows that include increased efficiencies. While such games/applications may allow for power reductions via execution of the reduced shading rate, the power reductions may not be as large as other power reductions for other games/applications that have less efficient render flows.

The table 500 is indicative of test data for games/applications that have less efficient render flows, where the test data is again compared for each game/application based on the full shading rate and the reduced shading rate. In both cases of the shading rate, the GPU is able to maintain a target FPS processing rate (e.g., 60-61 FPS), but at a decreased power level when applying the reduced shading rate. For example, a power level of Game6 may be decreased by 619 mA and a power level of Game7 may be decreased by 429 mA. Accordingly, a larger power savings may be provided for games/applications with less efficient render flows than for games/applications with more efficient render flows. A decrease in the GPU peak frequency (e.g., from 840 MHz to 771 MHz) is similarly indicated in the table 500, as well as decreases in the GPU Busy-Average, the GPU Busy-Average Load, and the GPU Busy-Top Load. Other parameters associated with the CPU, the GPU, FPS, power, etc., are also indicated in the table 500.

Less efficient render flows may be based on a draw order that a game engine is unable to substantially adjust. For example, if engine code for the game engine may not be changed, the draw order may not be adjusted by the game engine. Accordingly, the reduced shading rate may be applied by the computing device to increase efficiency.

In an example, drawA may be a heavy draw that corresponds to 20% of a total GPU frame time. However, a rendered aspect of drawA may be subsequently covered by drawB. For instance, a render sequence may be that drawA renders terrain and drawB renders water. The frame may include certain content before drawA is performed and, after drawA is performed, the content may be updated based on drawA (e.g., the terrain may be rendered in certain regions of the frame). After drawA is performed, several other draws may render aspects of the frame, such as the sky and other objects. Subsequently, the content of drawB may cover some regions of the content of drawA. Thus, all or some portions of the content rendered based on drawA may not be perceived by an end user, even though the GPU utilized 20% of the frame time to render the content. By detecting a heavy draw, such as drawA, and reducing the shading rate for drawA, power may be conserved without a substantially perceivable visually quality loss.

Figure 6:
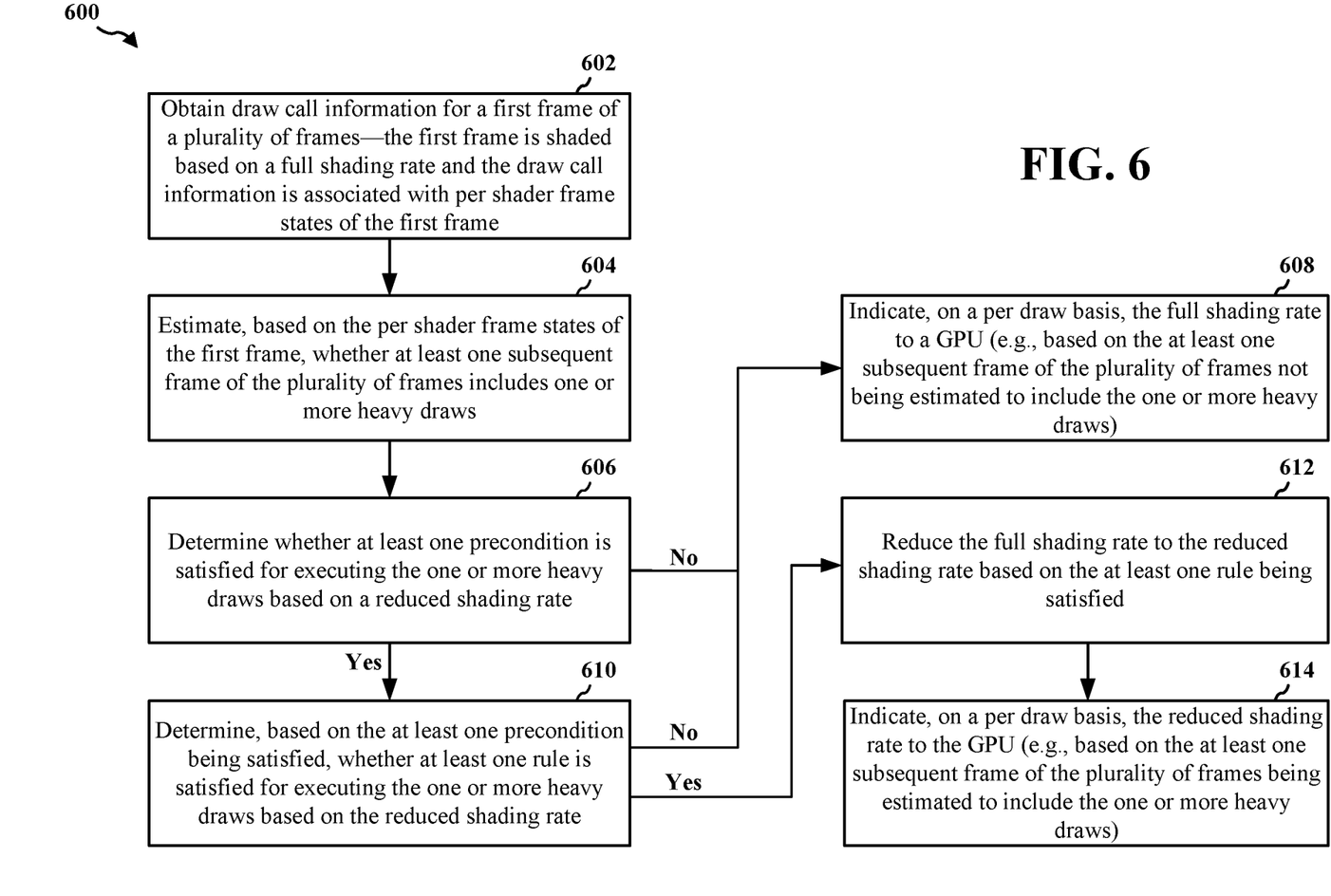
FIG. 6 is a flowchart of an example method of graphics processing in accordance with one or more techniques of this disclosure.

FIG. 6 is a flowchart 600 of an example method of graphics processing in accordance with one or more techniques of this disclosure. The method may be performed by an apparatus, such as an apparatus for graphics processing, a GPU driver, a CPU, a wireless communication device, and the like, as used in connection with the aspects of FIGS. 1-5.

At 602, the apparatus may obtain draw call information for a first frame of a plurality of frames—the first frame is shaded based on a full shading rate and the draw call information is associated with per shader frame states of the first frame. For example, referring to FIGS. 2-3, the GPU driver 206 included in the CPU 202 may receive, at 205, draw call information from the application 204. Further, the Record drawCall info procedure may be performed, at 302, for frame N. The Record drawCall info may be updated, at 304, in association with per shader frame states of frame N (e.g., the per shader frame states may be determined, at 210). The draw call information may be associated with the per shader frame states at an end of the first frame (e.g., at an end of frame N).

At 604, the apparatus may estimate, based on the per shader frame states of the first frame, whether at least one subsequent frame of the plurality of frames includes one or more heavy draws. For example, referring to FIGS. 2-3, the CPU 202 may estimate, at 212, whether subsequent frame(s) (e.g., frames N+1 to N+64 in the diagram 300) include one or more heavy draws, based on the per shader frame states determined for frame N. The estimation of whether the one or more subsequent frames include the one or more heavy draws may be further based on determinations of whether precondition(s) and rule(s) are satisfied for reducing a shading rate.

At 606, the apparatus may determine whether at least one precondition is satisfied for executing the one or more heavy draws based on the reduced shading rate. For example, referring to FIGS. 2-3, the CPU 202 may determine, at 216, whether precondition(s) are satisfied for reducing a shading rate. The preconditions may be satisfied when the preconditions are confirmed, at 316, for one or more of the frames N+1 to N+64. If the at least one precondition is not satisfied, the apparatus (e.g., CPU 202) may perform the indication at 218/608.

At 608, the apparatus may indicate, on a per draw basis, the full shading rate to a GPU (e.g., based on the at least one subsequent frame of the plurality of frames not being estimated to include the one or more heavy draws). For example, referring to FIG. 2, the CPU 202 may indicate, at 218/222, the full shading rate to the GPU 208 when draw(s) of the subsequent frame(s) are not determined, at 216/220, to satisfy the precondition(s) and the rule(s) for the reduced shading rate.

At 610, if the at least one precondition is satisfied, the apparatus may determine, based on the at least one precondition being satisfied, whether at least one rule is satisfied for executing the one or more heavy draws based on the reduced shading rate. For example, referring to FIGS. 2-3, the CPU 202 may determine, at 220, whether rule(s) are satisfied for reducing the shading rate. The rules may be satisfied when the rules are confirmed, at 322, for one or more of the frames N+1 to N+64. In a first aspect, the at least one rule for executing the one or more heavy draws based on the reduced shading rate may be associated with the per shader frame states of the first frame (e.g., the Top-3-vertMulTexSample performed, at 306, the Top-5-vertexCount performed, at 308, the Top-5-TextureSample performed, at 310, and/or the VertexCount stdDev performed, at 312). In a second aspect, the at least one rule for executing the one or more heavy draws based on the reduced shading rate may be independent of the per shader frame states of the first frame (e.g., the AlphaTest performed, at 324, and/or the preZ-ed/z-prepass performed, at 326). If the at least one rule is not satisfied, the apparatus (e.g., CPU 202) may perform the indication at 222/608.

At 612, if the at least one rule is satisfied, the apparatus may reduce the full shading rate to the reduced shading rate based on the at least one rule being satisfied. For example, referring to FIGS. 2-3, the CPU 202 may set, at 224, the reduced shading rate. Further, the reduced shading rate may be determined, at 328, where the determination corresponds to maintaining a default/full shading rate or setting a reduced shading rate (e.g., half shading rate or quarter shading rate).

At 614, the apparatus may indicate, on a per draw basis, the reduced shading rate to the GPU (e.g., based on the at least one subsequent frame of the plurality of frames being estimated to include the one or more heavy draws). For example, referring to FIG. 2, the CPU 202 may indicate, at 226, the reduced shading rate to the GPU 208 when the draw(s) of the subsequent frame(s) are estimated, at 212, to include the one or more heavy draws. The reduced shading rate may be indicated, at 226, on a per draw basis to the GPU 208. In aspects, the reduced shading rate may correspond to a half-shading rate or a quarter-shading rate. The at least one subsequent frame may be rendered, at 228, by the GPU 208 after the CPU 202 indicates the full shading rate (e.g., 218/222) or the reduced shading rate (e.g., at 226) to the GPU 208.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining draw call information for a first frame of a plurality of frames, the first frame being shaded based on a full shading rate, the draw call information associated with per shader frame states of the first frame; means for estimating, based on the per shader frame states of the first frame, whether at least one subsequent frame of the plurality of frames includes one or more heavy draws; and means for indicating a reduced shading rate, when the at least one subsequent frame of the plurality of frames is estimated to include the one or more heavy draws, the reduced shading rate being less than the full shading rate. The apparatus may further include means for determining that at least one precondition is satisfied for executing the one or more heavy draws based on the reduced shading rate. The apparatus may further include means for determining, based on the at least one precondition being satisfied, that at least one rule is satisfied for executing the one or more heavy draws based on the reduced shading rate. The apparatus may further include means for reducing the full shading rate to the reduced shading rate based on the at least one rule being satisfied. The apparatus may further include means for indicating, on a per draw basis, the full shading rate to a GPU, when the at least one subsequent frame of the plurality of frames is not estimated to include the one or more heavy draws.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, comprising: obtaining draw call information for a first frame of a plurality of frames, the first frame being shaded based on a full shading rate, the draw call information associated with per shader frame states of the first frame; estimating, based on the per shader frame states of the first frame, whether at least one subsequent frame of the plurality of frames includes one or more heavy draws; and indicating a reduced shading rate, when the at least one subsequent frame of the plurality of frames is estimated to include the one or more heavy draws, the reduced shading rate being less than the full shading rate.

Aspect 2 may be combined with aspect 1 and includes that the reduced shading rate is indicated on a per draw basis to a GPU.

Aspect 3 may be combined with any of aspects 1-2 and further includes determining that at least one precondition is satisfied for executing the one or more heavy draws based on the reduced shading rate.

Aspect 4 may be combined with any of aspects 1-3 and further includes determining, based on the at least one precondition being satisfied, that at least one rule is satisfied for executing the one or more heavy draws based on the reduced shading rate.

Aspect 5 may be combined with any of aspects 1-4 and includes that the at least one rule for executing the one or more heavy draws based on the reduced shading rate is associated with the per shader frame states of the first frame.

Aspect 6 may be combined with any of aspects 1-5 and includes that the at least one rule for executing the one or more heavy draws based on the reduced shading rate is independent of the per shader frame states of the first frame.

Aspect 7 may be combined with any of aspects 1-6 and further includes reducing the full shading rate to the reduced shading rate based on the at least one rule being satisfied.

Aspect 8 may be combined with any of aspects 1-7 and further includes indicating, on a per draw basis, the full shading rate to a GPU, when the at least one subsequent frame of the plurality of frames is not estimated to include the one or more heavy draws.

Aspect 9 may be combined with any of aspects 1-8 and includes that the at least one subsequent frame is rendered after indicating the full shading rate or the reduced shading rate.

Aspect 10 may be combined with any of aspects 1-9 and includes that the draw call information is associated with the per shader frame states at an end of the first frame.

Aspect 11 may be combined with any of aspects 1-10 and includes that the reduced shading rate corresponds to a half-shading rate or a quarter-shading rate.

Aspect 12 is an apparatus for graphics processing including at least one processor coupled to a memory and configured to implement a method as in any of aspects 1-11.

Aspect 13 may be combined with aspect 12 and includes that the apparatus is a wireless communication device.

Aspect 14 is an apparatus for graphics processing including means for implementing a method as in any of aspects 1-11.

Aspect 15 is a computer-readable medium storing computer executable code, the code when executed by at least one processor causes the at least one processor to implement a method as in any of aspects 1-11.

Various aspects have been described herein. These and other aspects are within the scope of the following claims.

What is claimed is:

1. An apparatus for graphics processing, comprising:
a memory; and
at least one processor coupled to the memory and configured to:
obtain draw call information for a first frame of a plurality of frames, the first frame being shaded based on a full shading rate, the draw call information associated with per shader frame states of the first frame;
estimate, based on the per shader frame states of the first frame, whether at least one subsequent frame of the plurality of frames includes one or more heavy draws; and
indicate a reduced shading rate, when the at least one subsequent frame of the plurality of frames is estimated to include the one or more heavy draws, the reduced shading rate being less than the full shading rate.

2. The apparatus of claim 1, wherein the reduced shading rate is indicated on a per draw basis to a graphics processing unit (GPU).

3. The apparatus of claim 1, wherein the at least one processor is further configured to determine that at least one precondition is satisfied for executing the one or more heavy draws based on the reduced shading rate.

4. The apparatus of claim 3, wherein the at least one processor is further configured to determine, based on the at least one precondition being satisfied, that at least one rule is satisfied for executing the one or more heavy draws based on the reduced shading rate.

5. The apparatus of claim 4, wherein the at least one rule for executing the one or more heavy draws based on the reduced shading rate is associated with the per shader frame states of the first frame.

6. The apparatus of claim 4, wherein the at least one rule for executing the one or more heavy draws based on the reduced shading rate is independent of the per shader frame states of the first frame.

7. The apparatus of claim 4, wherein the at least one processor is further configured to reduce the full shading rate to the reduced shading rate based on the at least one rule being satisfied.

8. The apparatus of claim 1, wherein the at least one processor is further configured to indicate, on a per draw basis, the full shading rate to a graphics processing unit (GPU), when the at least one subsequent frame of the plurality of frames is not estimated to include the one or more heavy draws.

9. The apparatus of claim 8, wherein the at least one subsequent frame is rendered after indicating the full shading rate or the reduced shading rate.

10. The apparatus of claim 1, wherein the draw call information is associated with the per shader frame states at an end of the first frame.

11. The apparatus of claim 1, wherein the reduced shading rate corresponds to a half-shading rate or a quarter-shading rate.

12. The apparatus of claim 1, wherein the apparatus is a wireless communication device.

13. A method of graphics processing, comprising:
obtaining draw call information for a first frame of a plurality of frames, the first frame being shaded based on a full shading rate, the draw call information associated with per shader frame states of the first frame;
estimating, based on the per shader frame states of the first frame, whether at least one subsequent frame of the plurality of frames includes one or more heavy draws; and
indicating a reduced shading rate, when the at least one subsequent frame of the plurality of frames is estimated to include the one or more heavy draws, the reduced shading rate being less than the full shading rate.

14. The method of claim 13, wherein the reduced shading rate is indicated on a per draw basis to a graphics processing unit (GPU).

15. The method of claim 13, further comprising determining that at least one precondition is satisfied for executing the one or more heavy draws based on the reduced shading rate.

16. The method of claim 15, further comprising determining, based on the at least one precondition being satisfied, that at least one rule is satisfied for executing the one or more heavy draws based on the reduced shading rate.

17. The method of claim 16, wherein the at least one rule for executing the one or more heavy draws based on the reduced shading rate is associated with the per shader frame states of the first frame.

18. The method of claim 16, wherein the at least one rule for executing the one or more heavy draws based on the reduced shading rate is independent of the per shader frame states of the first frame.

19. The method of claim 16, further comprising reducing the full shading rate to the reduced shading rate based on the at least one rule being satisfied.

20. The method of claim 13, further comprising indicating, on a per draw basis, the full shading rate to a graphics processing unit (GPU), when the at least one subsequent frame of the plurality of frames is not estimated to include the one or more heavy draws.

21. The method of claim 20, wherein the at least one subsequent frame is rendered after indicating the full shading rate or the reduced shading rate.

22. The method of claim 13, wherein the draw call information is associated with the per shader frame states at an end of the first frame.

23. The method of claim 13, wherein the reduced shading rate corresponds to a half-shading rate or a quarter-shading rate.

24. A non-transitory computer-readable medium storing computer executable code, the code when executed by at least one processor, causes the at least one processor to:
obtain draw call information for a first frame of a plurality of frames, the first frame being shaded based on a full shading rate, the draw call information associated with per shader frame states of the first frame;
estimate, based on the per shader frame states of the first frame, whether at least one subsequent frame of the plurality of frames includes one or more heavy draws; and
indicate a reduced shading rate, when the at least one subsequent frame of the plurality of frames is estimated to include the one or more heavy draws, the reduced shading rate being less than the full shading rate.

\* \* \* \* \*